United States Patent
Wang et al.

(10) Patent No.: US 10,134,145 B2
(45) Date of Patent: Nov. 20, 2018

(54) METHOD AND APPARATUS FOR INTELLIGENT VIDEO PRUNING

(71) Applicant: Pelco, Inc., Clovis, CA (US)

(72) Inventors: Lei Wang, Clovis, CA (US); Farzin Aghdasi, Clovis, CA (US); Greg M. Millar, Coarsegold, CA (US); Stephen J. Mitchell, Reedley, CA (US)

(73) Assignee: Pelco, Inc., Clovis, CA (US)

( * ) Notice: Subject to any disclaimer, the term of this patent is extended or adjusted under 35 U.S.C. 154(b) by 1 day.

(21) Appl. No.: 15/105,897

(22) PCT Filed: Dec. 24, 2013

(86) PCT No.: PCT/US2013/077673
§ 371 (c)(1),
(2) Date: Jun. 17, 2016

(87) PCT Pub. No.: WO2015/099704
PCT Pub. Date: Jul. 2, 2015

(65) Prior Publication Data
US 2017/0039729 A1 Feb. 9, 2017

(51) Int. Cl.
*G06T 7/254* (2017.01)
*H04N 19/172* (2014.01)
(Continued)

(52) U.S. Cl.
CPC ........... *G06T 7/254* (2017.01); *H04N 19/117* (2014.11); *H04N 19/132* (2014.11);
(Continued)

(58) Field of Classification Search
CPC .... G06T 7/254; H04N 19/117; H04N 19/132; H04N 19/137; H04N 19/172
(Continued)

(56) References Cited

U.S. PATENT DOCUMENTS

2006/0165386 A1 7/2006 Garoutte
2008/0170751 A1* 7/2008 Lei .......................... G06T 7/215
382/103

(Continued)

OTHER PUBLICATIONS

Notification of Transmittal of The International Search Report and Written Opinion of the International Searching Authority dated Apr. 18, 2014 from International Application No. PCT/US2013/077673, "Method and Apparatus for Intelligent Video Pruning," filed Dec. 24, 2013.

(Continued)

*Primary Examiner* — Mishawn Hunter
(74) *Attorney, Agent, or Firm* — Locke Lord LLP

(57) ABSTRACT

According to at least one example embodiment, a method and corresponding apparatus of pruning video data comprise detecting motion areas within video frames of the video data based on short-term and long-term variations associated with content of the video data. Motion events, associated with the content of the video data, are then identified based on the motion areas detected, corresponding filtered motion areas, and variation patterns associated with the video data. Based on the motion events identified, a storage pattern for storing video frames of the video data is determined. The video frames are stored according to the determined storage pattern.

27 Claims, 5 Drawing Sheets

(51) Int. Cl.
*H04N 19/117* (2014.01)
*H04N 19/132* (2014.01)
*H04N 19/137* (2014.01)

(52) U.S. Cl.
CPC ......... *H04N 19/137* (2014.11); *H04N 19/172* (2014.11); *G06T 2207/10016* (2013.01); *G06T 2207/20021* (2013.01); *G06T 2207/20036* (2013.01); *G06T 2207/20076* (2013.01); *G06T 2207/30232* (2013.01)

(58) Field of Classification Search
USPC .................................. 386/239, 241, 248
See application file for complete search history.

(56) References Cited

U.S. PATENT DOCUMENTS

2012/0170803 A1* 7/2012 Millar ................ G06K 9/00771
382/103
2012/0219174 A1* 8/2012 Wu .................... G06K 9/00711
382/103
2012/0288015 A1 11/2012 Zhang et al.
2013/0030875 A1 1/2013 Lee et al.

OTHER PUBLICATIONS

International Preliminary Report on Patentability dated Jun. 28, 2016 from International Application No. PCT/US2013/077673, "Method and Apparatus for Intelligent Video Pruning," filed Dec. 24, 2013.
Supplementary European Search Report dated Jun. 16, 2017 from International Application No. PCT/US2013/077673, "Method and Apparatus for Intelligent Video Pruning," filed Dec. 24, 2013.
Jeannin, Sylvie, et al., "MPEG-7 Visual Motion Descriptors," IEEE Transactions on Circuits and Systems for Video Technology, IEEE Service Center, vol. 11, No. 6, 5 pages, Jun. 2001.

* cited by examiner

| NUMBER OF DAYS | FULL VIDEO | ALL VIDEO EVENTS | FILTERED VIDEO EVENTS | RAW I-FRAMES | FILTERED I-FRAMES | RAW KEY-FRAMES | FILTERED KEY-FRAMES | TOTAL SIZE |
|---|---|---|---|---|---|---|---|---|
| 0-3 | 0-63 | 0 | 0 | 0 | 0 | 0 | 0 | 0-63 |
| 4-6 | 63 | 7-21 | 0 | 0 | 0 | 0 | 0 | 70-84 |
| 7-10 | 63 | 21 | 2-8 | 1-4 | 0 | 0 | 0 | 87-96 |
| 11-14 | 63 | 21 | 8 | 5-8 | 0.5-2.0 | 0 | 0 | 97.5-102 |
| 15-18 | 63 | 21 | 8 | 8 | 2.5-4.0 | 0.05-0.20 | 0 | 102.55-104.2 |
| 19-28 | 63 | 21 | 8 | 8 | 4 | 0.25-0.7 | 0.025-0.25 | 102.55-104.95 |

FIG. 5

METHOD AND APPARATUS FOR INTELLIGENT VIDEO PRUNING

This application is the U.S. National Stage of International Application No. PCT/US2012/077673, filed Dec. 24, 2013, which designates the U.S., published in English. The entire teachings of the above application are incorporated herein by reference.

BACKGROUND OF THE INVENTION

Non-compressed video data is a sequence of video frames, or images. As such, storing video data is typically associated with large memory consumption. Many video applications involve storing large amounts of video data. For example, video surveillance systems are typically designed to capture video data continuously and store the captured video for potential future access whenever needed.

SUMMARY OF THE INVENTION

In video applications that involve storage of a large amount of video content, the available memory capacity usually imposes limitations on how much video data may be stored. In such case, it is useful to identify, and prioritize storing of, video content of relatively higher importance.

According to at least one example embodiment, a method and corresponding apparatus for pruning video data, comprise detecting motion areas within video frames of video data based on short-term and long-term variations associated with content of the video data. Motion events associated with the content of the video data are identified based on the motion areas detected, corresponding filtered motion areas, and variation patterns associated with the video data. Storage periods for the video frames of the video data are then determined based on the motion events identified. The video frames are stored according to the determined storage periods.

The filtered motion areas are also identified. For example, the filtered areas are associated with repetitive motion. As such, sub-areas within the already identified motion areas and associated with repetitive motion are identified. The sub-areas associated with repetitive motion are then excluded from already identified motion areas resulting in filtered motion areas. If the camera capturing the video data is not fixed, e.g., a rotating video camera, the variation in the content of the video data due to camera motion may be estimated and filtered.

According to at least one example embodiment, motion detection, for motion areas and filtered motion areas, is performed based on separate detection time periods. In a detection time period one or more motion descriptors are generated for each corresponding video frame. For example, for each video frame, a first descriptor is generated based on the corresponding identified motion areas, and a second descriptor is generated based on the corresponding filtered motion areas. A motion descriptor includes an indication of a distribution of motion areas within each video frame, an indication of a relative amount of motion areas within each video frame, and/or a maximum number of motion pixels within a single video block.

Once the motion descriptors are generated, video frames within separate analysis time period are analyzed, and one or more indicators of variation patterns within each analysis time period are determined. The determined indicators are stored for use in identifying the motion events. The motion events are identified based on one or more thresholds. For example, the thresholds may include a minimum period of motion, a minimum motion level, and a maximum gap period between two consecutive motion events. According to an example aspect, the thresholds are determined adaptively for each analysis time period. For example, motion events are initially identified within an analysis time period based on default thresholds. If the number of identified motion events is considered to be too high, the default thresholds are increased and the process of identifying motion events is repeated. However, if the identified motion events are considered to be too few, the default thresholds are decreased, and the process of identifying motion events is repeated.

According to at least one example embodiment, motion events are ranked. Based on the ranking of the motion events, the storage periods of video frames are determined. For example, the higher the rank associated with a motion event, the longer one or more corresponding video frames are stored.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 5 is a table illustrating a pattern of storing video data and corresponding memory consumption, according to at least one example embodiment.

DETAILED DESCRIPTION OF THE INVENTION

A description of example embodiments of the invention follows.

Figure 1:
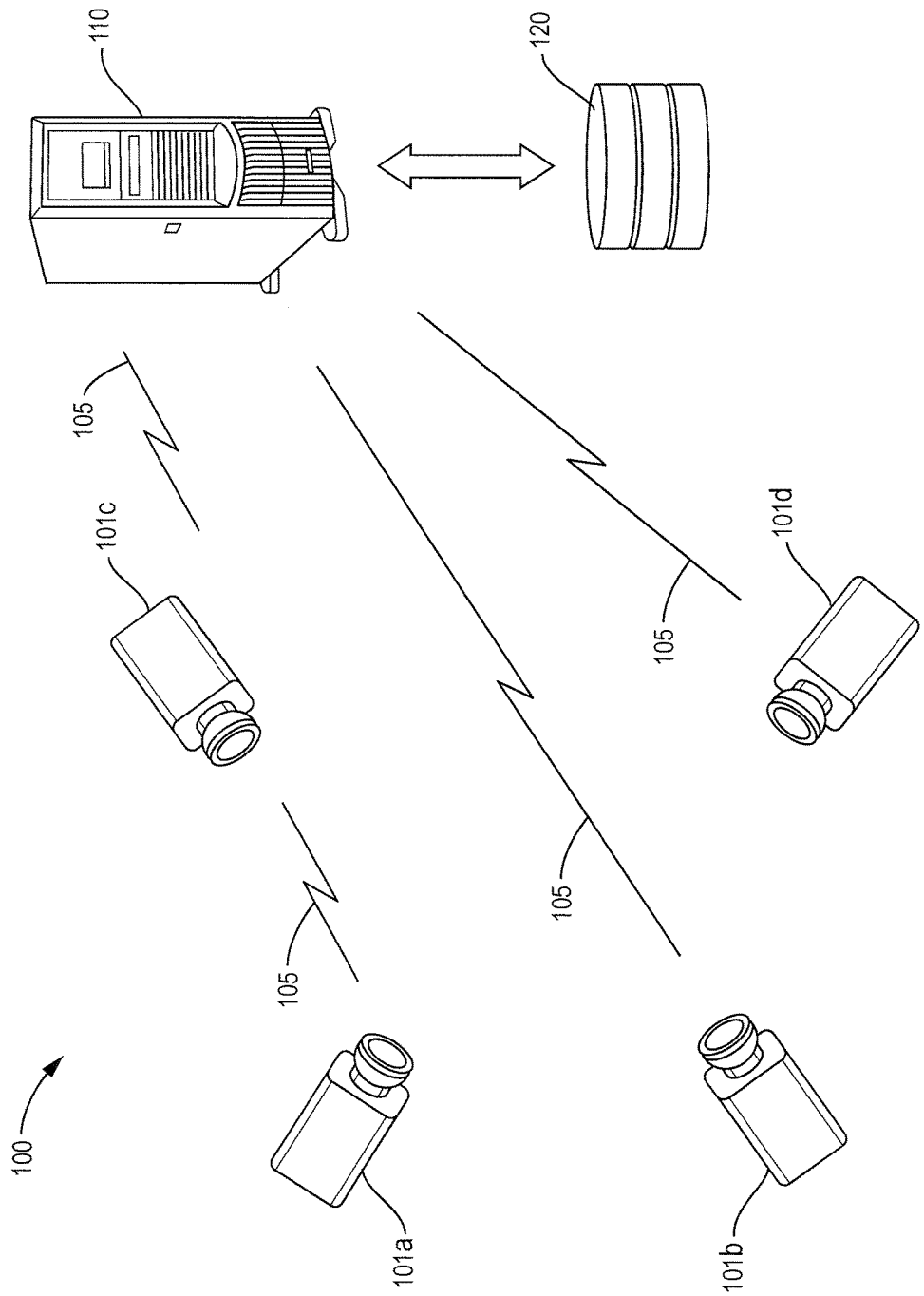
FIG. 1 is a diagram illustrating a video surveillance system, according to at least one example embodiment.

FIG. 1 is a diagram illustrating a video surveillance system 100, according to at least one example embodiment. The video surveillance system 100 includes one or more cameras, e.g., 101a-101d, a processing device 110, and a storage device 120. The processing device 110 may be a computer device, e.g., a personal computer, a laptop, a server, a tablet, a handheld device, etc., or a computing device having a processor and a memory with computer code instructions stored therein. For example, the processing device 110 may be a processor embedded in the camera(s), e.g., 101a-101d, or may be a video server that is configured to store and analyze the video data captured by the camera(s), e.g., 101a-101d. The storage device 120 is a memory device, e.g., an external memory device, a server, etc., configured to store video data recorded by the camera(s), e.g., 101a-101d. According to an example implementation, the processing device 110 and the storage device 120 are components of the same electronic device. Alternatively, the processing device 110 and the storage device 120 are implemented in one, or each, of the cameras 101a-101d. According to even another implementation, the camera(s), e.g., 101a-101d, the processing device 110, and the storage device 120 are coupled to each other through a communications network, such as, a local area network, a wide area network, a combination thereof, or the like. The camera(s), e.g., 101a-101d, may be coupled to the processing device 110 or the storage device 120 through a wired or wireless link 105.

In the video surveillance system 100, the camera(s), e.g., 101a-101d, typically capture video data continuously. The recorded video data is usually stored for a period of time for potential access if needed. The longer the video data is stored, the more is the likelihood to provide access to previously recorded events. As such, the dilemma in designing a video surveillance system, e.g., 100, is to store as much video content of interest as possible, given a hardware storage capacity. In particular, one day of recorded video data results in millions of video frames, or equivalently Giga bytes of video data, to be stored. Given a memory storage capacity of the surveillance system 100, or equivalently of the storage device 120, the goal is to store as much video content of interest as possible and, therefore, to keep records of as many interesting events as possible.

Storing all recorded video frames results in storing video content of interest as well as video content with no events of interest. As such, storing video content with no events of interest consumes storage space that otherwise would be available to store video content indicative of events of interest. Users of the video surveillance system 100 typically like to keep records of events of interest over the longest period possible. Also, simply storing intra (I-) frames and discarding inter-prediction (P-) frames does not provide adequate stored information for accessing previous events of interest.

According to at least one example embodiment, captured video data is analyzed and motion events are identified based on motion, or temporal variation, information derived from the captured video data. Herein, a motion event is defined as sequence of video frames, or a period of time, within which significant motion is detected almost continuously over adjacent video frames. A motion event may include one or more relatively short periods with no significant motion detected. The motion information derived includes raw and filtered motion information. Raw motion information includes motion information determined based on short-term and long-term variation detected from the captured video data. The filtered motion information is generated by excluding at least repetitive motion from the raw motion.

The identified motion events are used to determine a storage pattern according to which video corresponding frames are stored. For example, the more relevant is a motion event, the longer the corresponding video frames are stored in the storage device 120. According to an example implementation, the identified video events are classified, or ranked, in terms of relevance or importance through unsupervised learning based on the corresponding motion information. The classification, or ranking, information for each motion event is then used in determining a storage pattern for the video frames associated with the same motion event. Given a storage capacity, the storage patterns determined enable storage of relevant or informative video data for much longer than typical video pruning techniques do.

Figure 2:
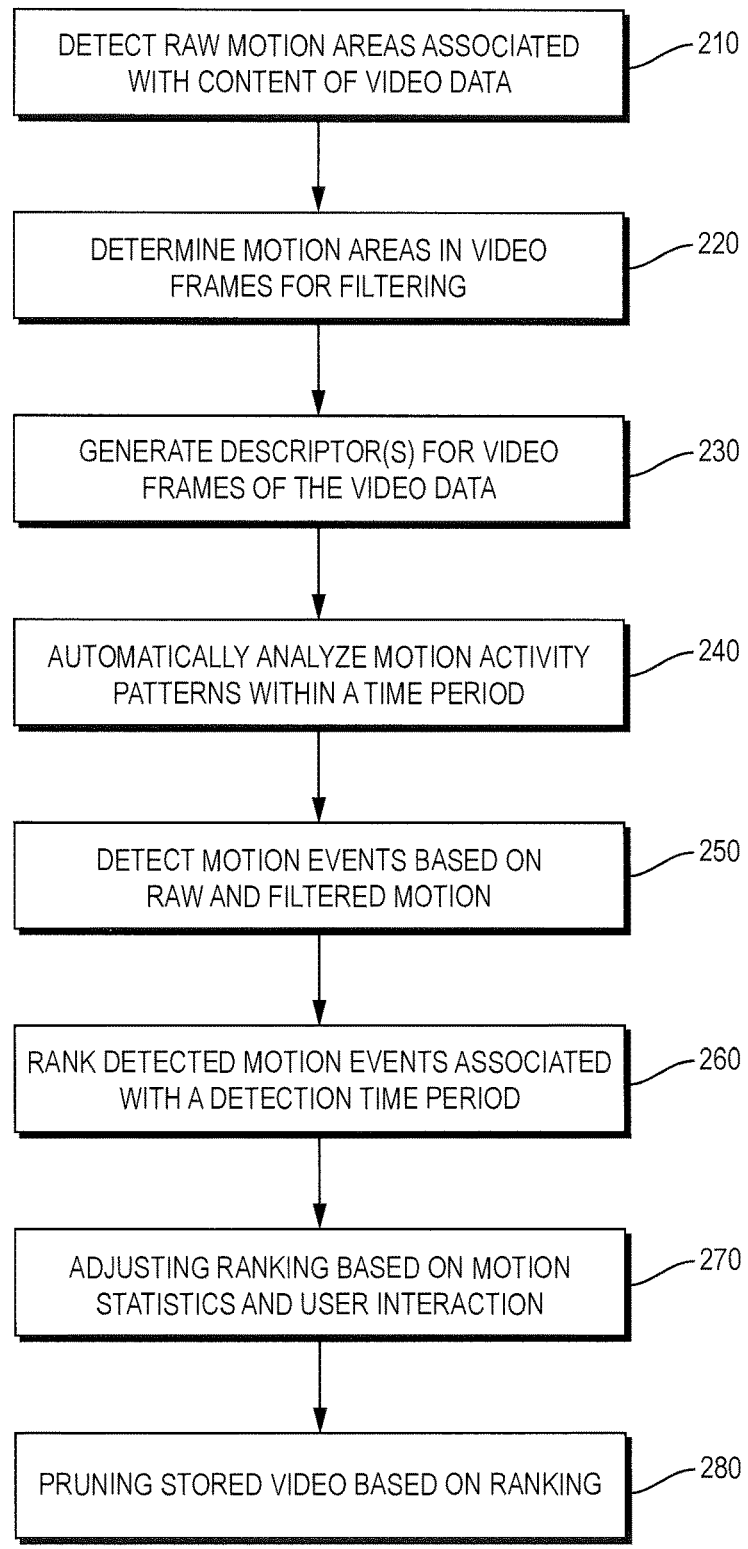
FIG. 2 is a flowchart illustrating a method of pruning video data according to at least one example embodiment.

FIG. 2 is a flowchart illustrating a method 200 of pruning video data, according to at least one example embodiment. Video data captured by the camera(s), e.g., 101a-101d, may be directly stored in the storage device 120 or forwarded to the processing device 110 for processing before being stored at the storage device 120. At block 210, raw motion areas, e.g., pixels, are detected based on short-term and long-term temporal variation associated with a current video frame. Long-term variation may be detected using background subtraction techniques such as Gaussian mixture model (GMM), moving average, or the like. Short-term variation may be detected, for example, by subtracting a previous video frame from the current video frame.

A threshold is then employed to label pixels of the current video frame as "motion" or "still" pixels. Pixels of the current frame that differentiate from the background above the threshold are labeled as "motion" pixels. Also, pixels of the current frame that differentiate from the corresponding pixels in the previous frame above the threshold are labeled as "motion" pixels. The same threshold value or different threshold values may be used with long-term and short-term variations. The threshold(s) may be dynamic based on the content of the current video frames. In order to suppress the effect of lighting changes, normalized cross correlation may be used as a metric in detecting motion pixels. A person skilled in the art should appreciate that the use of both long-term variation and short-term variation results in less noisy estimation of motion pixels.

Once motion pixels are detected, the current video frame is divided into N×N video blocks, where N is an integer. A second threshold is then used to label each block as "motion" or "still" block. If the count of "motion" pixels is greater than the second threshold, the block is labeled as "motion" block; otherwise it is labeled as a "still" block. Morphological erosion or opening may be applied to remove noise "motion" pixels prior to labeling the video blocks. For example, relatively small or thin "motion" areas are usually eliminated when morphological erosion or opening is applied to the current video frame.

At block 220, the detected "motion" blocks are filtered and corresponding filtered "motion" blocks are determined. In filtering motion blocks, labeling of corresponding video blocks in at least one previous video frame is considered. In other words, filtered motion is determined based on the motion information in the current video frame and previous video frames.

Figure 3:
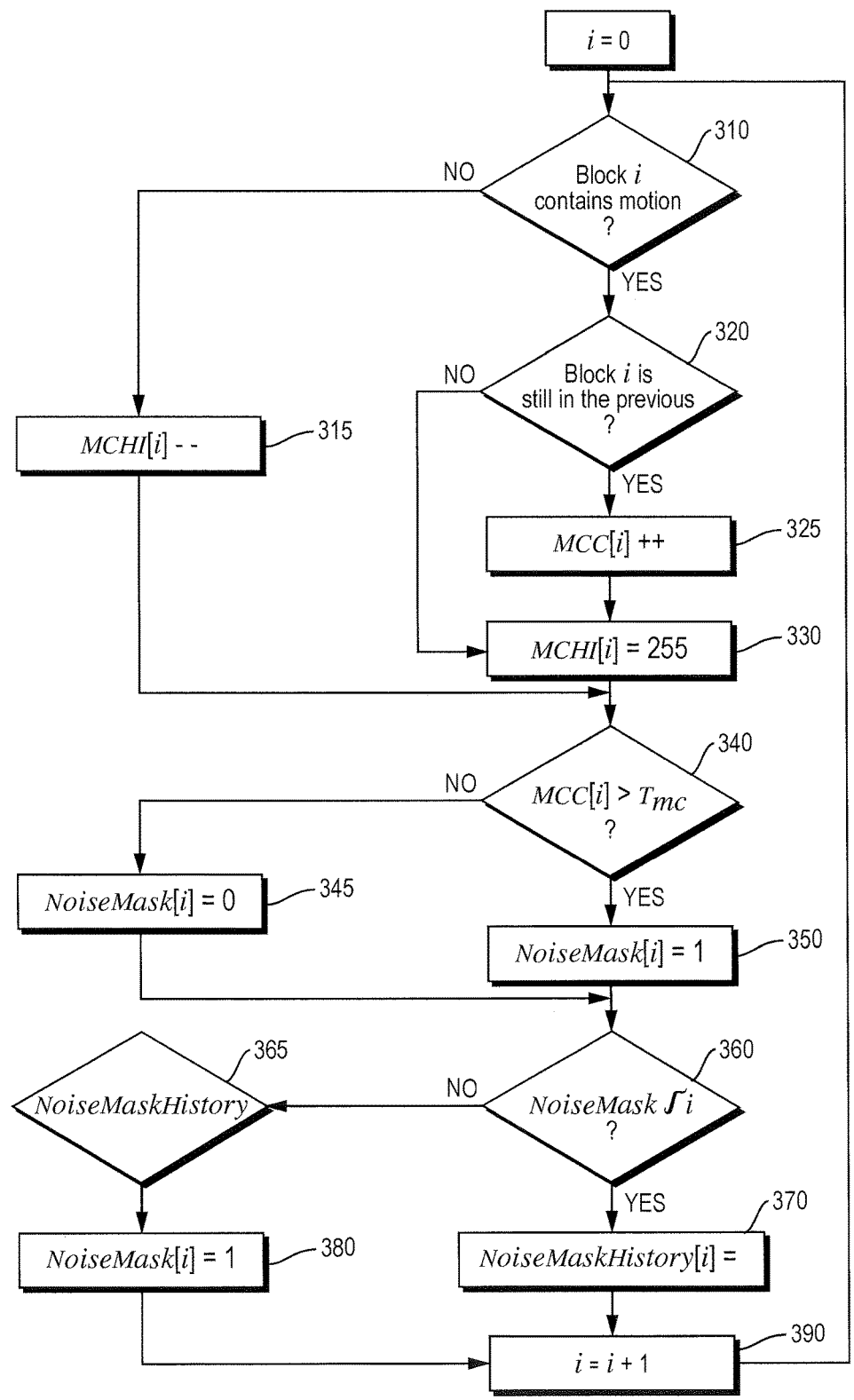
FIG. 3 is a flowchart illustrating a method of identifying motion blocks for filtering, according to at least one example embodiment.

FIG. 3 is a flowchart illustrating a method of identifying motion blocks for filtering, according to at least one example embodiment. A motion change counter (MCC) is defined for each video block to indicate the number of times the video block labeling flips from "still" to "motion" within a corresponding detection time period. As such, MCC is used to detect repetitive or fluctuating motion. For example, each detection time period has a predefined duration, e.g., five or ten minutes, and the MCC is reset at the start of each detection period. A motion change history image (MCHI) is proposed to keep motion history for each video block. For a video block in the current video frame, the labeling of the video block is checked at block 310. If the video block is labeled "still," the corresponding MCHI is decremented at block 315. However, if the video block is labeled "motion," the labeling of the same video block in a previous video frame is checked at block 320. If the labeling of the video block in the previous video frame is "still," the MCC corresponding to the video block is incremented at block 325. The MCHI for the same video block is set a maximum value at block 330 if the current video block is labeled as "motion." The MCHI is also reset with each new detection time period.

At block 340, the MCC for the video block is compared against a labeling change threshold value. If MCC is greater than the labeling change threshold, a corresponding noise mask entry is set to 1, at block 350, indicating that a corresponding detected motion is noise, or irrelevant, motion. For example, a user of the video surveillance system 100 is typically not interested in keeping track of a wavering flag, or moving leaves and tree branches. If the MCC corresponding to the video block is smaller than the labeling change threshold, the corresponding noise mask entry is set to 0 at block 245. If the noise mask entry for the video block is set to 0 (block 260), a history mask entry, indicating the history of the noise mask entry for the video block over previous video frames, is checked at block 265. If the history mask entry is greater than 0, the noise mask for the video block is set to 1 at block 380. If the noise mask entry is found to be equal to 1 at block 360, the corresponding history mask entry is set to a positive value at block 370. The history mask keeps track of the past noise mask values and is employed to suppress noise even if there is no motion for a while in a corresponding video scene. The process described with respect to FIG. 3 is repeated for all video blocks within the current video frame. The noise mask is then employed to filter detected raw motion in the current video frame.

At block 230 of FIG. 2, at least one motion descriptor for the current video frame is generated. A motion descriptor includes a motion activity value, a motion distribution indicator, and a maximum number of "motion" pixels in a "motion" video block. The motion activity value indicates the percentage of the motion blocks detected within a corresponding video frame. The motion distribution indicator represents the distribution of the video blocks with the corresponding video frame. For example, the motion distribution indicator may be a sequence of bits with each bit being indicative of whether a corresponding video block is labeled as "motion" or "still." For example, the whole video frame may be divided into 8×8 or finer video blocks evenly. Each bin of the motion distribution indicator corresponds to a video block in the video frame. For a video block that contains a number of motion pixels greater than a threshold number, the corresponding bit is set to 1. For a video block that contains a number of motion pixels fewer than the threshold number, the corresponding bit is set to 0. As such, a 32-bit integer represents 32 video blocks, which is an efficient way to describe motion distribution in the video frame. The maximum number of "motion" pixels in a "motion" video block is a statistical parameter used to assess the amount of motion in the video frame. A person skilled in the art should appreciate that other statistical parameters, e.g., average number of "motion" pixels per "motion" video block, minimum number of "motion" pixels in a "motion" video block, a combination thereof, or the like, may be employed.

The parameters associated with a motion descriptor are used to differentiate motion from scattered noise. According to at least one example embodiment, for each video frame processed, two motion descriptors are generated. One motion descriptor corresponds to the raw motion detected in the video frame, while the other motion descriptor is obtained based on the corresponding filtered motion.

According to at least one example embodiment, the processes described in blocks 210-230 are performed for video frames associated with a detection time period. In other words, the video data recorded by the camera(s), e.g., 101a-101d, is processed as separate sequences of video, each sequence of video frames corresponds to a detection time period. The video frames in each video sequence associated with a detection time period are processed together. At block 240, motion activity patterns within a current analysis time period are analyzed and corresponding metrics are calculated and stored. In particular, the probability distribution of motion within each video block i is estimated within the current detection time period. The superscript t refers to the analysis time period associated with the video frames being processed. For example, the analysis time periods may be defined on an hourly basis with each hour of the day representing one time period. Alternatively, analysis time periods may be defined differently, e.g., not all time periods have the same duration. For example, an analysis time period may be one hour or two hours long. A person skilled in the art should appreciate that other durations for the analysis time periods may be defined. Alternatively, the analysis time period may be defined in terms of a number of consecutive video frames. A person skilled in the art should appreciate that other statistical or non-statistical parameters may be calculated as part of the analysis of the motion patterns within each analysis time period. Also, parameters associated with the same analysis time period in one or more previous days may be incorporated in characterizing the motion patterns associated with a given detection time period.

At block 250, motion events within the current analysis time period are detected based on the motion descriptors associated with video frames in the current analysis time period and the parameters obtained as part of the analysis of motion patterns associated with the current analysis time period. A motion event is defined herein as sequence of video frames, or a corresponding time interval in the current analysis time period, within which significant motion is detected almost continuously over adjacent video frames. A motion event may include one or more relatively short periods with no significant motion detected. According to at least one example embodiment, a motion event is identified based on the amount of motion activity within corresponding video frames, the length of the time interval, or number of consecutive video frames, carrying almost continuous motion, and length of gap period(s) associated with "still" video frames within a time interval carrying almost continuous motion.

Specifically, a motion activity threshold is employed to each video frame within the current analysis time period as "motion" frame or "still" frame. A video frame is labeled as "motion" frame if a corresponding motion activity level is greater than the motion activity threshold. For example, motion activity may be defined in a range [0,100] with 0 indicating no motion and 100 indicating full motion in the scene. The same range is employed for both raw and filtered motion. A person skilled in the art should appreciate that the motion activity may be defined differently.

According to an example embodiment, a first set of motion events are detected based on detected raw motion, and a second set of motion events are detected based on corresponding filtered motion. Once the video frames with the current time period are labeled, two time thresholds are used to detect motion events. A first time threshold represents the minimum time period of almost continuous motion for detecting a motion event. The second time threshold represents minimum gap period between any two consecutive motion events. In particular, if a detected period of almost continuous motion is greater than the first time threshold, a corresponding motion event is identified based on the detected period of almost continuous motion, otherwise the detected period is ignored. Also, if a gap between two adjacent detected motion events is less than the second time threshold, the two detected motion events are merged into one longer motion event.

According to at least one example embodiment, at least one of the motion activity threshold, the first time threshold, and the second time threshold is defined, at least in part, based on the motion pattern analysis for the corresponding analysis time period. For example, the threshold(s) may be calculated based on the motion activity levels and frequency of motion events during the corresponding detection time period. Specifically, the threshold parameters may be determined iteratively based on, for example, the number of motion events detected. For instance, default threshold parameter values may be used in a first iteration and then updated in following iterations based on the number of motion events detected at each iteration. A person skilled in the art should appreciate that parameters associated with the same analysis time period in at least one previous day may also be used to set the threshold value(s). Employing adaptive thresholds, e.g., based on the corresponding motion pattern analysis, allows for more reliable motion event detection at different times of the day. For example, using fixed threshold values for all time periods makes it hard to detect motion at daytime and night since the motion levels at daytime and night are totally different.

According to an example implementation, the adaptive thresholds are determined iteratively. Given a default threshold of motion activity, initial motion events are identified. If too few motion events are detected, the adaptive threshold is decreased and motion events are detected again. Such process is repeated until the number of motion events detected is larger than a corresponding minimum. Otherwise, if too many events are detected or too long period of events are detected, the motion adaptive threshold is increased and motion events are detected again. The process is repeated until the number of motion events detected drops to a predefined range.

Once the motion events are detected, the motion events detected based on the raw and filtered motion, within the current detection time period, are ranked at block 260. The ranking is performed based on the detected raw and filtered motions. The ranking of motion events may be viewed as a way of classifying the motion events based on corresponding importance or relevance. For example, motion events associated with both raw and filtered motion(s) are considered to be more relevant than motion events associated only raw motion(s).

Figure 4:
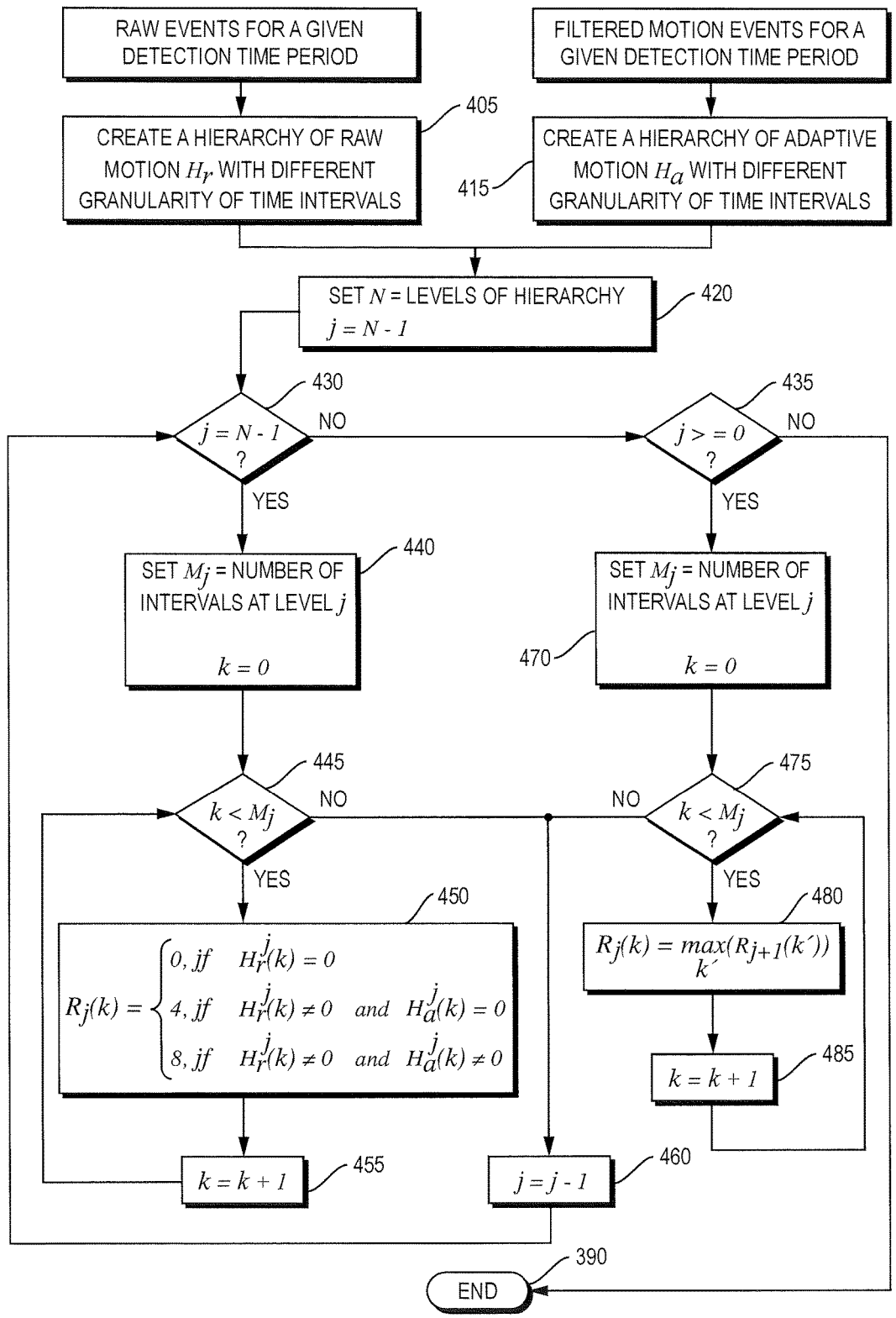
FIG. 4 is a flowchart illustrating a method of ranking motion events, according to at least one example embodiment.

FIG. 4 is a flowchart illustrating a method of ranking motion events, according to at least one example embodiment. At first, one or more hierarchies are defined, at blocks 405 and 415, for motion events detected based on raw motion and motion events detected based on filtered motion. The hierarchy contains several layers. Layer 0, for example, is the top layer, which has coarsest time interval, e.g., with five minutes duration. That is, the analysis time period is divided into, for example, 12 five-minutes time periods. The next layers contain finer and finer time intervals, e.g., one-minute, 20-seconds, 5-seconds, and/or even one-second, time intervals.

At blocks 440 to 455, the ranking of the motion event at the lowest level of ranking hierarchy is calculated. Based on the ranking information calculated at the lowest level of hierarchy, the ranking of the motion event at upper levels of the hierarchy are constructed with coarser and coarser time granularities as shown at blocks 470 to 485. For example the time interval at the lowest level is 1 second, and that of the higher levels may be 10 seconds, 1 minute, and/or 5 minutes. According to an example embodiment, a sequence of video frames with no raw motion detected therein is assigned the lowest rank. A higher rank is assigned to motion events where only raw motions are detected. An even higher rank is assigned to motion events with both raw and filtered motions detected therein.

The ranking of motion events is performed starting from the bottom layer which contains the finest time intervals and ending with coarsest, or largest, time intervals within a given hierarchy. The rankings of motion events are propagated from finest intervals to corresponding larger intervals. From the bottom layer, e.g., layer N−1, and up, the hierarchy is built layer by layer. From layer j+1 to layer j, the maximum ranking of the time intervals will be assigned to the corresponding coarser time interval until the top layer or the coarsest layer, e.g., layer 0, is reached.

At block 270, calculated rankings of motion events are adjusted based on motion pattern statistics or parameters, e.g., computed at block 240, and user interaction with video frames associated with the same motion events. For example, the ranking of a motion event with motion detected at corresponding video blocks with relatively low motion probability, e.g., $P_i^t$, is increased as an indication of unexpected motion(s) within the motion event. Also, user queries are tracked and stored in the processing device 110 or the database 120. For example, start and end time of user queries, motion patterns associated with video frames that are subject of the user queries, and the time of accessed video segments by users are stored by the surveillance system 100. Using the stored information related to user queries, rankings of motion events associated with user queries and exports, or access, of video frames are increased. The ranking(s) of detected motion events similar to the motion events associated with user queries and at the same time slot of a day may also be increased as part of ranking adjustment.

At block 280, a pattern of storing video data is determined based on the detected motion events and corresponding rankings, and the video data is stored accordingly in the database 120. According to at least one example embodiment, the video segments associated with the lowest ranked motion events are deleted first. However, video segments associated with higher ranked motion events are stored for a longer time based on the corresponding rankings and free storage spaces available at the database 120.

FIG. 5 is a table illustrating a pattern of storing video data based on detected raw events and corresponding ranking(s), according to at least one example embodiment. All video segments, regardless of corresponding rankings, are stored for a first predefined period of time, e.g., three days. Once the first predefined period of time is passed, only video segments associated with detected motion events, e.g., with rank equal to or greater than four, are stored for a second predefined period of time, e.g., days 4 to 6, and the other video segments are deleted. After the second predefined period of time is passed, video segments associated with motion events having filtered motion, e.g., with rank greater than 7, are stored for a third predefined time period, e.g., days 7-10. Also, I-frames associated with motion events having only raw motion, e.g., with rank between 4 and 7, are kept stored during the third predefined time period.

After the third predefined period, only I-frames corresponding to motion events having only filtered motion are kept for a fourth predefined period, e.g., days 11-14. During a fifth predefined period, e.g., days 15 to 18, only key frames associated with motion events having only raw motion are kept stored in the database 120. During a sixth predefined period, e.g., days 19 to 28, only key frames associated with motion events having filtered motions are kept stored in the database 120. After the sixth predefined time period, the key frames corresponding to motion events with filtered motion are deleted. Key frames are defined as the I-frames that contain the most significant motion for the period of the corresponding motion event. The last row of the table in FIG. 5 shows the memory consumption corresponding to each predefined time period.

Assuming a video bit rate, for a single camera, of 2 Megabits per second, storing the corresponding video data captured in one day consumes 21 Giga Bytes of memory. If a memory capacity of 105 Giga Bytes is allocated per single camera, the memory capacity allows only five days of video data to be stored if no pruning is applied. However, by applying the storage pattern described in FIG. 5, some of the video content is kept stored up to 28 days.

According to at least one example embodiment, video data received from capturing camera(s), e.g., 101*a*-101*d*, is processed and analyzed on the fly by the processing device 110. For example, received video data is stored into separate video files, each corresponding to a detection time period. The capture time and position of each I-frame and the first p-frame of the video in a group of pictures (GOP) in the video file is recorded in the database for the raw video data. The rankings of the video event, the start time, and end time of the identified motion events are also stored. According to an example implementation, the I-frames and P-frames of the video data are stored separately. As such, all the P-frames maybe deleted together. Also, keeping track of the location of each GOP makes it easy to perform the video pruning process. In addition, the hierarchical ranking is useful especially if video pruning is to be performed hierarchically.

A person skilled in the art should appreciate that processes of video pruning described herein are example embodiments and are not to be interpreted in a restrictive manner. For example, instead of ranking the identified motion events, the motion events may be classified based on the corresponding detected motion areas. Also, if the capturing camera is moving, variation due to camera motion may be filtered. A person skilled in the art should also appreciate that the video pruning processes described herein may also be applied in video applications other than video surveillance. Furthermore, instead of defining time periods for storing video frames, a variable frame rate may be defined based on the detected motion events. Such variable frame rate may then be used in video data compression or video data transmission. Alternatively, variable video resolution or variable video quality may be defined based on the detected motion events.

It should be understood that the example embodiments described above may be implemented in many different ways. In some instances, the various methods and machines described herein may each be implemented by a physical, virtual or hybrid general purpose or application specific computer having a central processor, memory, disk or other mass storage, communication interface(s), input/output (I/O) device(s), and other peripherals. The general purpose or application specific computer is transformed into the machines that execute the methods described above, for example, by loading software instructions into a data processor, and then causing execution of the instructions to carry out the functions described, herein.

As is known in the art, such a computer may contain a system bus, where a bus is a set of hardware lines used for data transfer among the components of a computer or processing system. The bus or busses are essentially shared conduit(s) that connect different elements of the computer system, e.g., processor, disk storage, memory, input/output ports, network ports, etc., that enables the transfer of information between the elements. One or more central processor units are attached to the system bus and provide for the execution of computer instructions. Also attached to the system bus are typically I/O device interfaces for connecting various input and output devices, e.g., keyboard, mouse, displays, printers, speakers, etc., to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof.

In certain embodiments, the procedures, devices, and processes described herein constitute a computer program product, including a computer readable medium, e.g., a removable storage medium such as one or more DVD-ROM's, CD-ROM's, diskettes, tapes, etc., that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Embodiments may also be implemented as instructions stored on a non-transitory machine-readable medium, which may be read and executed by one or more processors. A non-transient machine-readable medium may include any mechanism for storing or transmitting information in a form readable by a machine, e.g., a computing device. For example, a non-transient machine-readable medium may include read only memory (ROM); random access memory (RAM); magnetic disk storage media; optical storage media; flash memory devices; and others.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A method of pruning video data, comprising:
   detecting, by a computer device, motion areas within video frames of the video data based on short-term and long-term variations associated with content of the video data;
   identifying sub-areas associated with repetitive motion within the motion areas identified;
   identifying filtered motion areas as the motion areas identified excluding the sub-areas associated with repetitive motion;
   identifying motion events associated with the content of the video data based on the motion areas detected, the filtered motion areas, and variation patterns associated with the video data;
   determining storage periods for the video frames of the video data based on the motion events identified; and
   storing, on a video playback medium, video frames associated with a first motion event for a first storage period and video frames associated with a second motion event for a second storage period that is longer than the first storage period, the video frames stored for the second storage period being a subset of the video frames stored for the first storage period, other video frames stored for the first storage period being deleted from the playback medium after the first storage period expires.

2. The method as recited in claim 1 further comprising generating one or more motion descriptors for each frame of the video data.

3. The method as recited in claim 2, wherein generating one or more motion descriptors for each frame of the video data includes:
   generating a first descriptor for each video frame based on the corresponding motion areas identified; and
   generating a second descriptor for each video frame based on the corresponding filtered motion areas.

4. The method as recited in claim 2, wherein each motion descriptor includes:
   an indication of a distribution of motion areas within each video frame; and
   an indication of a relative amount of motion areas within each video frame.

5. The method as recited in claim 2, wherein identifying the motion events includes identifying the motion events based on the one or more motion descriptors generated and one or more thresholds.

6. The method as recited in claim 5, wherein the one or more thresholds include at least one of:
   a minimum period of motion;
   a minimum motion level; and
   a maximum gap period between two consecutive motion events.

7. The method as recited in claim 5, wherein the at least one of the one or more thresholds is an adaptive threshold.

8. The method as recited in claim 7, wherein the at least one adaptive threshold and the motion events are identified iteratively.

9. The method as recited in claim 1 further comprising:
   determining one or more indicators of the variation patterns associated with the video data; and
   storing the one or more indicators of variation patterns determined for use in identifying the motion events.

10. The method as recited in claim 1 further comprising ranking the motion events identified.

11. The method as recited in claim 10, wherein a motion event identified based on filtered motion areas is ranked higher than a motion event detected based on non-filtered motion areas.

12. The method as recited in claim 10, wherein determining the storage periods of video frames includes determining storage periods of video frames associated with a motion event based on a ranking of the motion event.

13. The method as recited in claim 12, wherein a video frame associated with a high ranked motion event is stored for a longer period than a video frame associated with a low ranked motion event.

14. An apparatus for pruning video data, comprising:
   a processor; and
   a memory with computer code instructions stored thereon, the processor and the memory, with the computer code instructions stored thereon, being configured to cause the apparatus to:
   detect motion areas within video frames of the video data based on short-term and long-term variations associated with content of the video data;
   identify sub-areas associated with repetitive motion within the motion areas identified;
   identify filtered motion areas as the motion areas identified excluding the sub-areas associated with repetitive motion;
   identify motion events associated with the content of the video data based on the motion areas detected, the filtered motion areas, and variation patterns associated with the video data;
   determine storage periods for the video frames of the video data based on the motion events identified; and
   store, on a playback medium, video frames associated with a first motion event for a first storage period and video frames associated with a second motion event for a second storage period that is longer than the first storage period, the video frames stored for the second storage period being a subset of the video frames stored for the first storage period, other video frames stored for the first storage period being deleted from the playback medium after the first storage period expires.

15. The apparatus as recited in claim 14, wherein the processor and the memory, with the computer code instructions stored thereon, are further configured to cause the apparatus to generate one or more motion descriptors for each frame of the video data.

16. The apparatus as recited in claim 15, wherein in generating one or more motion descriptors for each frame of the video data, the processor and the memory, with the computer code instructions stored thereon, are further configured to cause the apparatus to:
   generate a first descriptor for each video frame based on the corresponding motion areas identified; and
   generate a second descriptor for each video frame based on the corresponding filtered motion areas.

17. The apparatus as recited in claim 15, wherein each motion descriptor includes:
   an indication of a distribution of motion areas within each video frame; and
   an indication of a relative amount of motion areas within each video frame.

18. The apparatus as recited in claim 14, wherein the processor and the memory, with the computer code instructions stored thereon, are further configured to cause the apparatus to:
   determine one or more indicators of the variation patterns associated with the video data; and store the one or more indicators of variation patterns determined for use in identifying the motion events.

19. The apparatus as recited in claim 14, wherein in identifying the motion events, the processor and the memory, with the computer code instructions stored thereon, are further configured to cause the apparatus to identify the motion events based on one or more thresholds.

20. The apparatus as recited in claim 19, wherein the one or more thresholds include at least one of:
a minimum period of motion;
a minimum motion level; and
a maximum gap period between two consecutive motion events.

21. The apparatus as recited in claim 19, wherein at least one of the one or more thresholds is an adaptive threshold.

22. The apparatus as recited in claim 21, wherein the processor and the memory, with the computer code instructions stored thereon, are further configured to cause the apparatus to identify the at least one adaptive threshold and the motion events iteratively.

23. The apparatus as recited in claim 22, wherein in determining the storage periods of video frames, the processor and the memory, with the computer code instructions stored thereon, are further configured to cause the apparatus to determine storage periods of video frames associated with a motion event based on a ranking of the motion event.

24. The apparatus as recited in claim 23, wherein a video frame associated with a high ranked motion event is stored for a longer period than a video frame associated with a low ranked motion event.

25. The apparatus as recited in claim 21, wherein the processor and the memory, with the computer code instructions stored thereon, are further configured to cause the apparatus to rank the motion events identified.

26. The apparatus as recited in claim 25, wherein a motion event identified based on filtered motion areas is ranked higher than a motion event detected based on non-filtered motion areas.

27. A non-transitory computer readable medium with computer software stored thereon, the computer software, when executed by a processor, being configured to cause an apparatus to:
detect motion areas within video frames of the video data based on short-term and long-term variations associated with content of the video data;
identify sub-areas associated with repetitive motion within the motion areas identified;
identify filtered motion areas as the motion areas identified excluding the sub-areas associated with repetitive motion;
identify motion events associated with the content of the video data based on the motion areas detected, the filtered motion areas, and variation patterns associated with the video data;
determine storage periods for the video frames of the video data based on the motion events identified; and
store, on a video playback medium, video frames associated with a first motion event for a first storage period and video frames associated with a second motion event for a second storage period that is longer than the first storage period, the video frames stored for the second storage period being a subset of the video frames stored for the first storage period, other video frames stored for the first storage period being deleted from the playback medium after the first storage period expires.

* * * * *